(12) United States Patent
Cho et al.

(10) Patent No.: US 8,005,521 B2
(45) Date of Patent: Aug. 23, 2011

(54) PORTABLE TERMINAL

(75) Inventors: Choong-Hyoun Cho, Seoul (KR); Won-Seok Joo, Seoul (KR); Hyo-Simg Park, Seoul (KR); Seung-Geun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 666 days.

(21) Appl. No.: 12/035,294

(22) Filed: Feb. 21, 2008

(65) Prior Publication Data
US 2008/0300031 A1 Dec. 4, 2008

(30) Foreign Application Priority Data

Jun. 1, 2007 (KR) .......................... 10-2007-0054055
Jun. 11, 2007 (KR) .......................... 10-2007-0056908

(51) Int. Cl.
*H04M 1/00* (2006.01)

(52) U.S. Cl. ................................ 455/575.3; 379/433.13
(58) Field of Classification Search ............... 455/575.3, 455/575.1, 575.8, 575.4, 557; 379/433.11, 379/433.12
See application file for complete search history.

(56) References Cited

U.S. PATENT DOCUMENTS

| 7,509,142 | B2 * | 3/2009 | Ditzik ......................... 455/557 |
| 7,593,524 | B2 * | 9/2009 | Maenpaa ................. 379/433.13 |
| 2004/0266502 | A1 * | 12/2004 | Holtorf et al. ............... 455/899 |
| 2005/0250560 | A1 * | 11/2005 | Gupte et al. ............... 455/575.3 |

* cited by examiner

*Primary Examiner* — Tu X Nguyen
(74) *Attorney, Agent, or Firm* — Birch, Stewart, Kolasch & Birch, LLP

(57) ABSTRACT

A portable terminal comprising first and second bodies, and a hinge unit configured to fold or unfold the first and second bodies in a rotational manner.

20 Claims, 18 Drawing Sheets

PORTABLE TERMINAL

CROSS REFERENCE TO RELATED APPLICATIONS

This application is related to and claims priority under 35 U.S.C. §119(a) to Patent Application Nos. 10-2007-0054055 and 10-2007-0056908 filed in Republic of Korea on Jun. 1 and Jun. 11, 2007, respectively, the entire contents of each being hereby incorporated by reference.

BACKGROUND OF THE INVENTION

1. Field of the Invention

The present invention relates to a portable terminal having a hinge unit for allowing two bodies to be opened and/or closed in a rotation manner.

2. Background of the Invention

Portable terminals can be easily carried and have one or more of functions such as supporting voice calls and telephony calls, inputting and/or outputting information, storing data and the like.

A multifunctional portable terminal can capture still images or moving images, play music or video files, play games, receive broadcast and the like, so as to be implemented as an integrated multimedia device.

Also, many users have their portable terminal modified to express their personality.

Conventional folder type terminals have hinges exposed to the exterior which restrict how various designs may be added for appearance. Also, conventional devices have a monotonous opening pattern that restricts customization of the opening patterns.

SUMMARY OF THE INVENTION

Therefore, an object of the present invention is to decrease restrictions for an appearance or design of a portable terminal.

Another object of the present invention is to provide a structure of a portable terminal in which hinges exposed to the exterior are avoided and in which two rotatable bodies can implement an appearance of the portable terminal as a single structure.

Still another object of the present invention is to provide a portable terminal having a more attractive appearance by disposing two hinges in a body so as to provide a new folder opening/closing pattern, and allowing two bodies to be connected to each other in the form of a curved line.

To achieve these and other advantages and in accordance with the purpose of the present invention, as embodied and broadly described herein, there is provided a portable terminal comprising: first and second bodies; and a hinge unit configured to fold or unfold the first and second bodies in a rotation manner, wherein the hinge unit comprises a hinge member coupled to each end portion of the first and second bodies, and a housing having one end coupled to the first body and the other end coupled to the second body, to thusly receive the hinge member therein such that the hinge member can not be exposed to the exterior.

In another embodiment of the present invention, there is provided a portable terminal comprising: first and second bodies; and a cover rotatably connected to each one end of the first and second bodies, and having an outer surface connecting the first and second bodies to each other in the form of a curved line.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Figure 1:
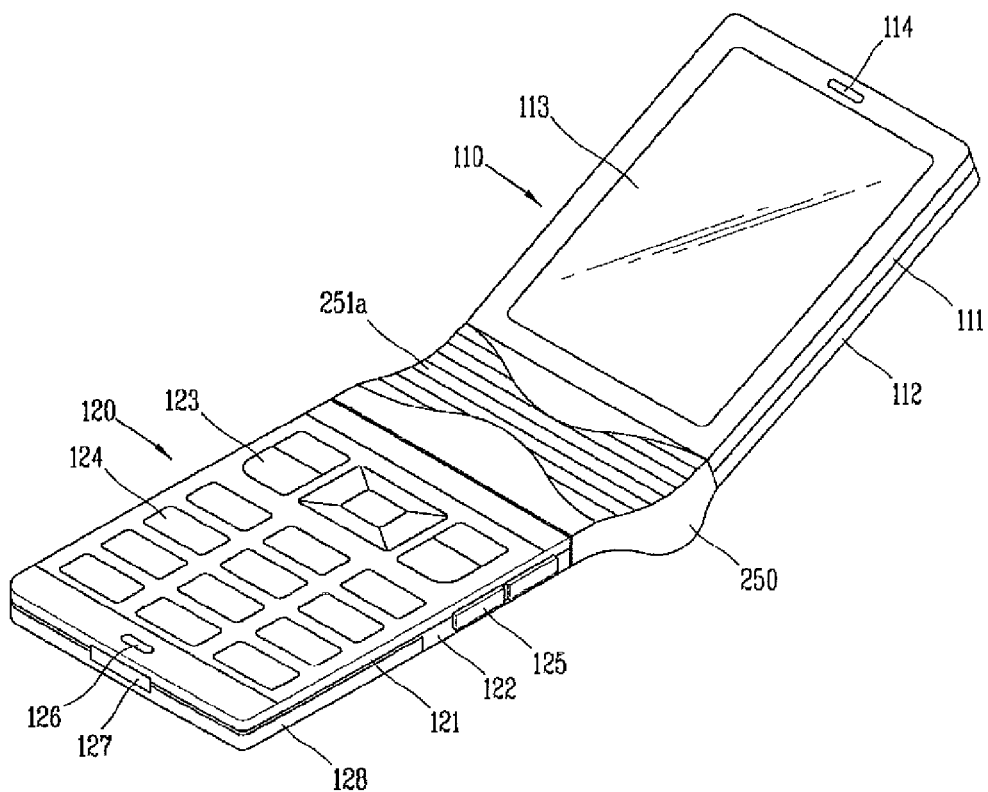
FIG. 1 is a front perspective view showing a portable terminal in accordance with a first embodiment of the present invention.

FIG. 1 is a perspective view showing a portable terminal in accordance with a first embodiment of the present invention.

The portable terminal according to the present invention comprises a first body 110 and a second body 120 configured to have at least one side folded or unfolded with respect to the first body 110. The first body 110 and the second body 120 are rotatably connected to each other by an integral hinge member 200.

A state in which the first body is overlaid on the second body 120 is referred to as a closed configuration. Also, as shown in FIG. 1, a state in which the first body 110 exposes at least part of the second body 120 is referred to as an open configuration.

The portable terminal mostly operates in a standby mode in the closed configuration, but the standby mode may be released by a user's manipulation. Also, the portable terminal mostly operates in a call mode in the open configuration, but the call mode may be converted into the standby mode by the user's manipulation or after a certain time.

A case (casing, housing, cover; etc.) configuring an appearance of the first body 110 may be formed by a front case 111 and a rear case 112. Various electric components are disposed inside a space formed between the front case 111 and the rear case 112.

The cases may be formed of a synthetic resin in a manner of injection, or formed of a metallic material such as stainless steel (STS) or titanium (Ti).

A first display 113 and a sound output unit 114 may be disposed at the first body at the front case 111.

The first display 113 includes a Liquid Crystal Display (LCD) module, Organic Light Emitting Diodes (OLED) module and the like to visually represent information. The first display 113 may further include a touch screen such that a user can input information in a touching manner.

The sound output unit 114 may be implemented as a receiver or a speaker.

Like the first body 110, the case of the second body 120 can be formed by a front case 121 and a rear case 122.

A first manipulating portion 123 and a second manipulating portion 124 may be disposed at the second body at a front face of the front case 121.

A third manipulating portion 125, a sound input unit 126 and an interface 127 may be disposed at least one of the front case 121 or the rear case 122.

The first to third manipulating portions 123, 124 and 125 may be referred to as a manipulating portion, which can adapt any manner like a tactile manner that a user can touch for manipulation.

For example, the manipulating portion may be implemented as a dome switch or touch switch, a touchpad or the like by which a user can input commands or information in a pushing or touching manner. Alternatively, the manipulating portion may be implemented, for example, as a wheel, a jog or a joystick.

Functionally, the first manipulating portion 123 is configured to input commands such as start, end, scroll or the like, and the second manipulating portion 124 is configured to input numbers, letters, symbols or the like. Also, the third manipulating portion 125 can be worked as a hot key which performs a specific function, such as activating an image input unit 116 (refer to FIG. 2).

The sound input unit 126 may be implemented, for example, as a microphone to receive user's voice or other sound.

The interface 127 may serve as a path which allows a portable terminal related to the present invention to exchange data with external devices. For example, the interface 127 may be used in a wired or wireless manner, and may be at least one of a connection terminal to which an earphone is connected, a port for a local communication (e.g., infrared data (IrDA) port, Bluetooth port, wireless LAN port, etc.), or a power supply terminal for supplying power to the portable terminal.

The interface 127 may be a Subscriber Identification Module (SIM), a User Identity Module (UIM) or a card socket for receiving an external card such as a memory card for storing information.

A power supplying unit 128 is disposed at the side of the rear case 122 to supply power to the portable terminal. The power supply unit 128 may be a rechargeable battery to be detachably coupled to the portable terminal for charging, for example.

Figure 2:
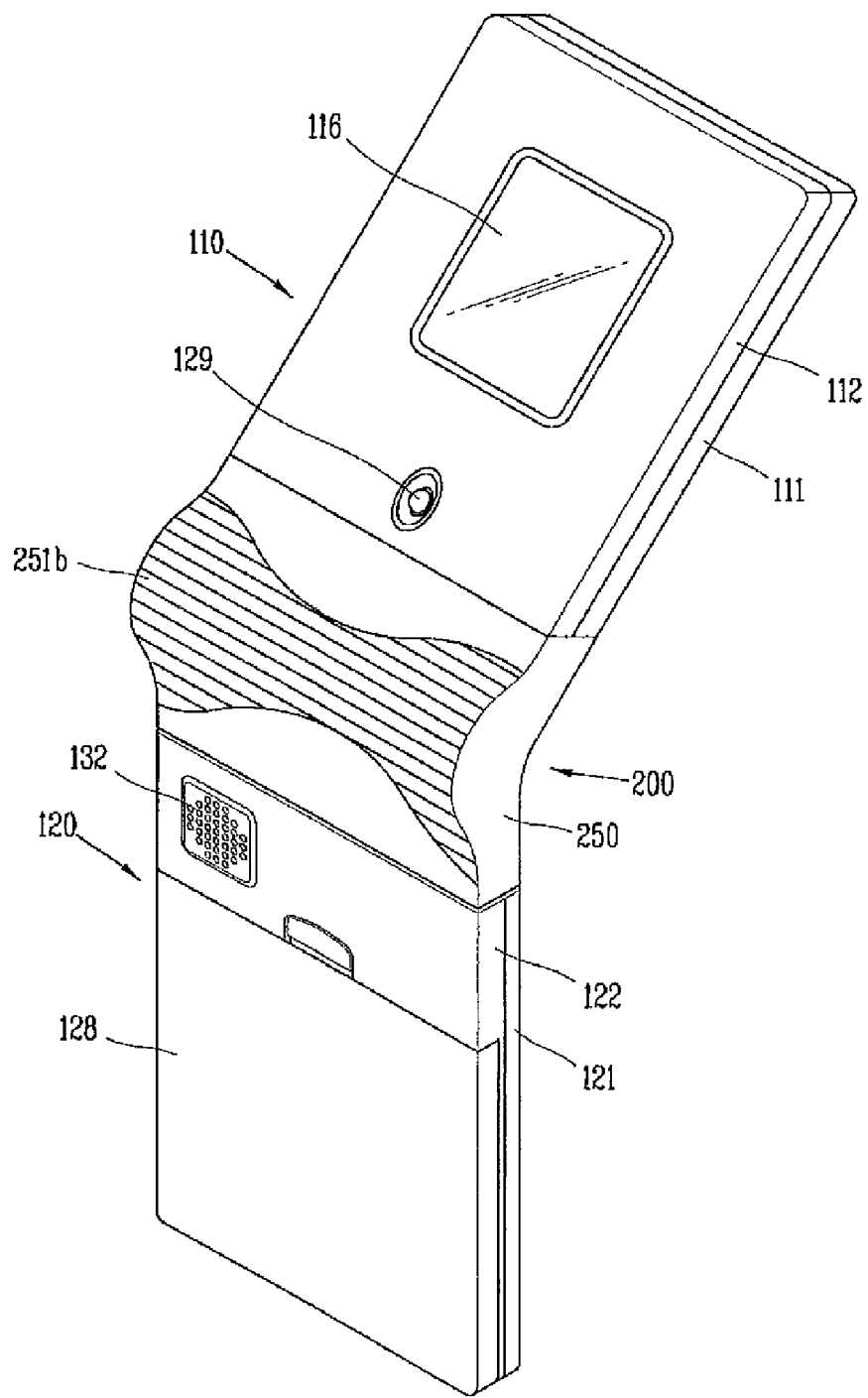
FIG. 2 is a rear perspective view of the portable terminal shown in FIG. 1.

FIG. 2 is a rear perspective view of the portable terminal shown in FIG. 1.

As shown in FIG. 2, a second display 116 may further be disposed at the rear case 111 of the first body 110. The second display 116 may be operated to assist the first display 113.

The image input unit 116 may be disposed at the rear case 111. The image input unit 116 may be implemented, for example, as a camera module for allowing users to capture still images or moving images.

A second sound Output unit 132 may further be provided at the rear case 122 of the second body 122. The second sound output unit 132 can implement a stereo function together with the first sound output unit 114 (See FIG. 1). The second sound output unit 132 may be used in a speakerphone mode when placing a call. The second sound output unit 132 can be disposed at the rear case 122 of the first body 110.

Figure 3:
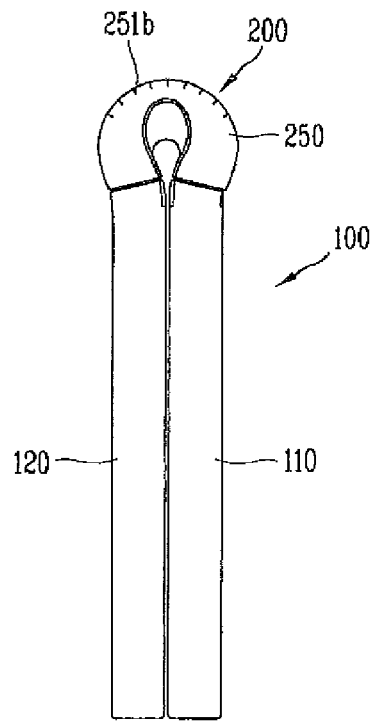
FIG. 3 is a view showing a lateral appearance when the portable terminal shown in FIGS. 1 and 2 is folded.

FIG. 3 is a schematic view showing a lateral appearance of the portable terminal shown in FIGS. 1 and 2 when in its closed configuration.

At each end portion of the first and second bodies 110 and 120 is provided with an integral hinge member 200 by which the first and second bodies 110 and 120 are coupled to each other to be open and closed. A housing 250 may be coupled to the integral hinge member 200 such that it can be integrally designed with the appearance of the two bodies 110 and 120. The housing 250 encompasses the hinge member 210 and 220, which is to be described later, such that the hinge member 210 and 220 can not be exposed to the exterior, namely, the hinge member 210 and 220 is accommodated inside the housing 250.

Figure 4:
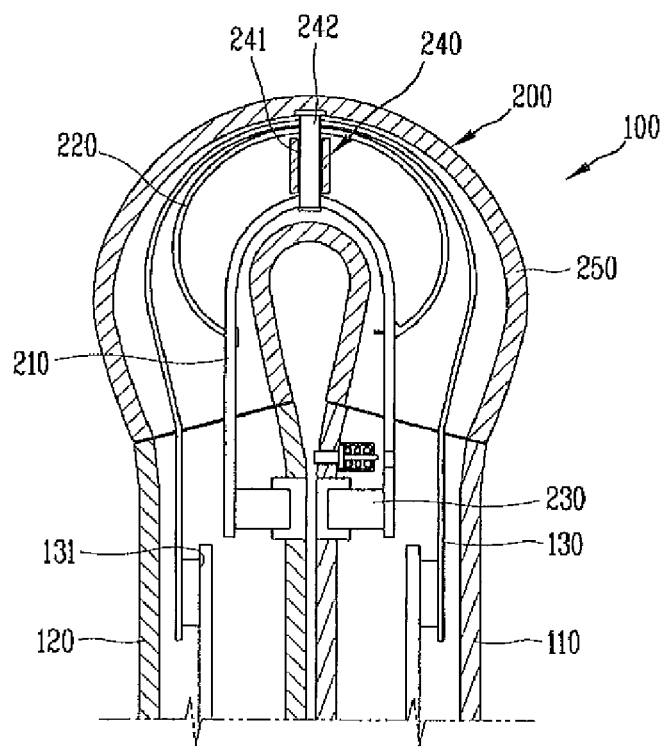
FIG. 4 is a lateral sectional view showing a configuration of a first embodiment of a hinge member provided in a housing shown in FIGS. 1 to 3.
Figure 5:
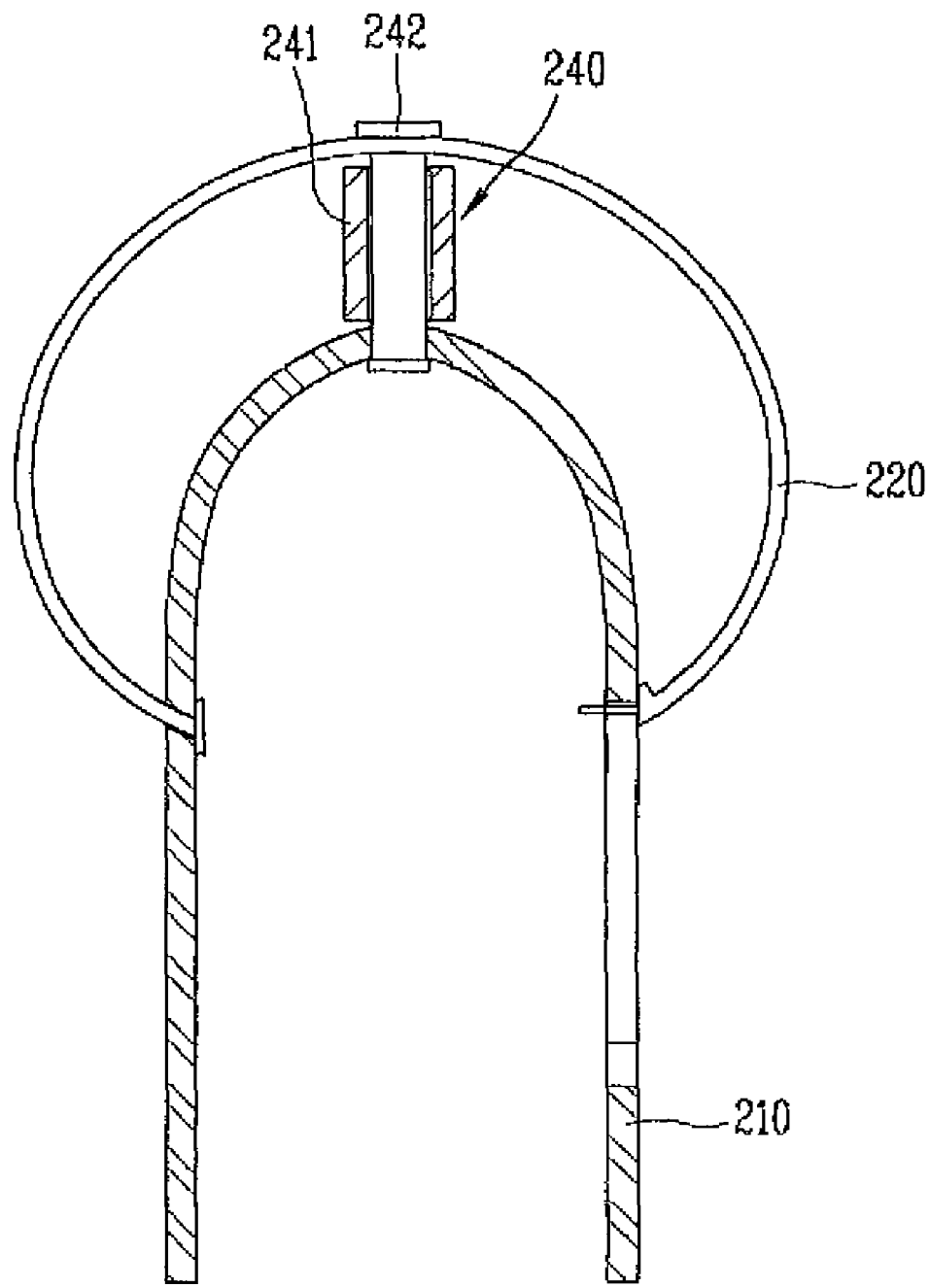
FIG. 5 is a view showing a coupled state of a hinge structure shown in FIG. 4.

FIG. 4 is a lateral sectional view schematically showing a configuration of a first embodiment of the hinge member 210 and 220 provided in the housing 250 shown in FIG. 2, and FIG. 5 is a view showing a coupled state of the hinge member 210 and 220 shown in FIG. 4.

The housing 250 has one end portion coupled to an end portion of the first body 110 and the other end portion coupled to an end portion of the second body 120 so as to form a space where the end portions of the first and second bodies 110 and 120 can be integrally coupled to each other. That is, the housing 250 may serve as a type of passage and accommodate the hinge member 210 and 220 therein, for example. Therefore, the housing 250 may have a structure of a hollow passage.

A Flexible Printed Circuit Board (FPCB) 130 for connecting each control circuit provided in the first and second bodies 110 and 120 electrically connects the first and second bodies 110 and 210, for example, via a connector 131. A middle portion of the connection member may be located in the housing 250. That is, the housing 250 can serve as a passage for components which electrically connect the first and second bodies 110 and 120 to each other. Therefore, the housing 250 may be formed of an elastic material.

When the first and second bodies 110 and 120 are open or closed, the housing is preferably not interrupted by other components accommodated therein and/or avoids the components disposed therein from being damaged. Therefore, the housing 250 can be formed of a material which can smoothly curved and have a particular hardness. For example, the housing 250 may be formed of a material having a particular hardness, such as rubber or the like. The housing 250 may further have wrinkled portions 251*a* and 251*b* (refer to FIGS. 1 to 3), such as bellows, at a certain one portion (e.g., a portion to be folded).

The hinge member 210 and 220 disposed in the housing 250 may be configured as same as those shown in FIGS. 4 and 5.

The hinge member 210 and 220 may include a supporting member 210 coupled to each end portion of the first and second bodies 110 and 210, and an elastic member 220 coupled to the supporting member 210 to apply a (opening/closing) force such that the first and second bodies 110 and 210 can be open and closed.

The supporting member 210, as shown in FIG. 4, has one end portion coupled to the first body 110 and the other end portion coupled to the second body 120. Here, the end portions of the supporting member 210 can be coupled respectively to the first and second bodies 110 and 120 via a coupling unit 230, such as screws, bolts or other types of coupling members. Such supporting member 210 can be implemented such that the first and second bodies 110 and 120 can be rotated (i.e., can be folded) based on the supporting member 210.

To the supporting member 210 is coupled the elastic member 220 which can apply the force such that the first and second bodies 110 and 120 can be open and closed as described above. The elastic member 220 may have one end portion coupled to one side of the supporting member 210 based on a central portion of the supporting member 210 and the other end portion coupled to the other side of the supporting member based on the central portion of the supporting member 210.

Figure 6A:
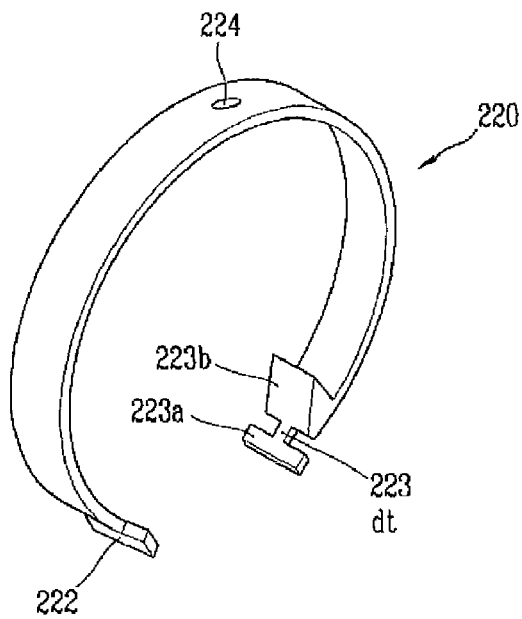
FIG. 6A is a perspective view showing an appearance of an elastic member.
Figure 6B:
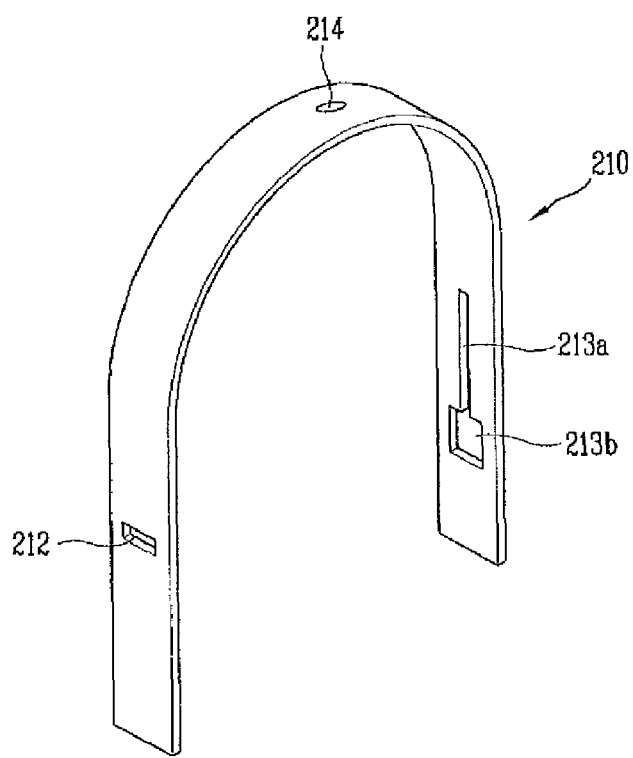
FIG. 6B is a perspective view showing an appearance of a supporting member.

FIG. 6A is a perspective view schematically showing an appearance of the elastic member 220 configuring the hinge member shown in FIG. 5, and FIG. 6B is a perspective view schematically showing an appearance of the supporting member 210 configuring the hinge member shown in FIG. 5.

The elastic member 220 can be coupled to the supporting member 210 to apply a force such that the first and second bodies 110 and 120 can be open and closed. To this end, the elastic member 220 and the supporting member 210 may be configured as shown in FIGS. 6A and 6B.

The elastic member 220 may be implemented as a plate-shaped spring which is curved to be annular. The supporting member 210 has a particular width. The supporting member 210 may be implemented to have a plate shape which can be curved as shown in the drawing. Alternatively, the supporting member 220 may be implemented to have a plurality of sections.

Both end portions of the elastic member 220 can be coupled to the supporting member 210 as described above.

One end portion of the elastic member 220 can be coupled to a certain portion of the supporting member 210 such that it can be slid by a certain interval. Describing one example of this configuration in detail, one end portion of the elastic member 220 may be coupled to one side of the supporting member with being fixed thereto, and the other end portion of the elastic member 220 may be coupled to the other side of the supporting member 210 so as to be slidable by a certain interval. Here, the slidable interval may correspond to an angle between open and closed positions of the first and second bodies 110 and 120.

On the other hand, the fixed one end portion of the elastic member 220 has a coupling portion 222 as shown in FIG. 6A, and the coupling portion 222 is inserted into a coupling hole 212 formed in one side of the supporting member 210 such that the elastic member 220 can not be separated from the supporting member 210.

The other end portion of the elastic member 220 can be coupled to the supporting member 210 so as to be slidable at the other side of the supporting member 210. The elastic member 220 may include an insertion portion 223 in which a slot 213*a* to be described hereafter is inserted to be then moved, and a protrusion 223*b* formed at a portion adjacent to the insertion portion 223 to lock (fix) the first and second bodies 110 and 120 in their open state.

In order to prevent the elastic member 220 from being separated from the slot 213*a*, an anti-separation portion 223*a* having a wider width than that of the slot 213*a* may be formed at one side of the insertion portion 223.

The insertion portion 223 of the elastic member 220 is mounted so as to be moved with being inserted into the slot 213*a*. As the insertion portion 223 is moved, the protrusion 223*b* is slid while being contacted by one face of the supporting member 210. A locking groove 213*b* in which the protrusion 223*b* is locked may be formed at one side of the supporting member 210. The locking groove 213*b* extends from the slot 213*a* to have a wider width than that of the slot 213*a*. Accordingly, the protrusion 223*b* can be engaged with the locking groove 213*b*.

Figure 7A:
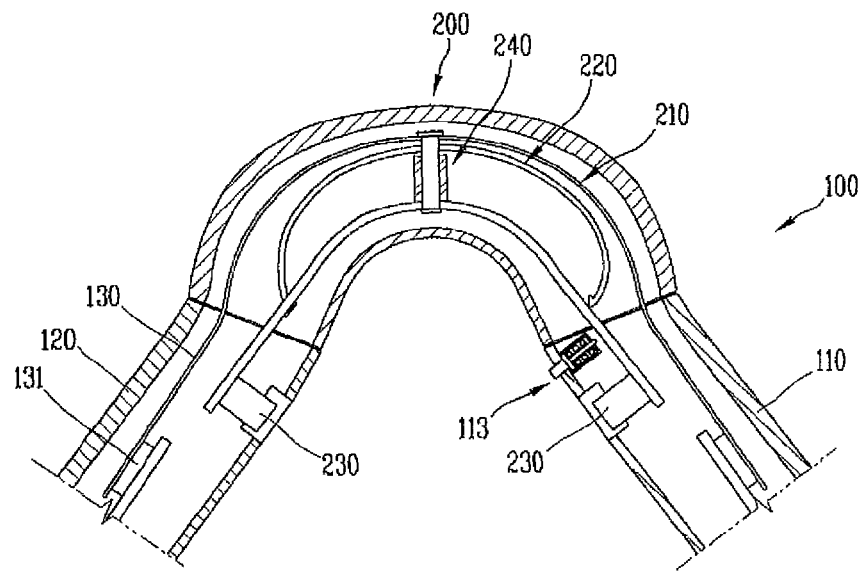
FIG. 7A is a lateral sectional view showing a state in which the hinge shown in FIGS. 1 to 3 is unfolded by a particular angle.
Figure 7B:
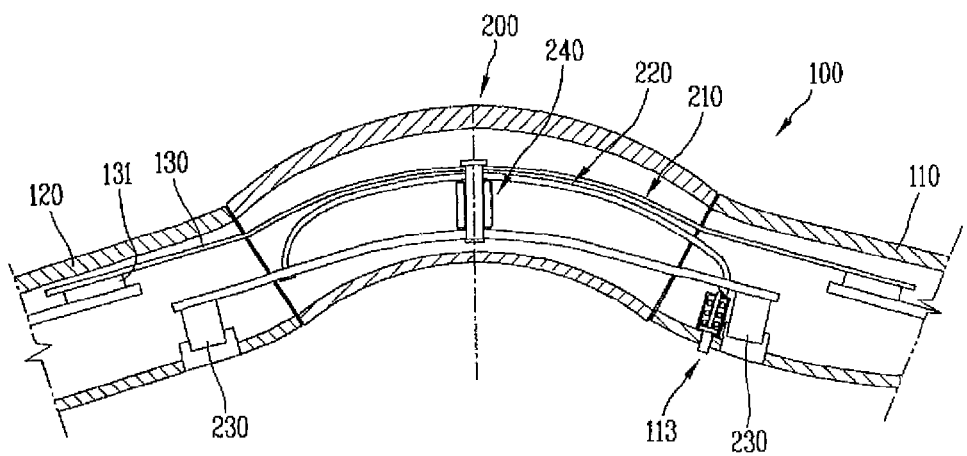
FIG. 7B is a lateral sectional view showing a state in which the hinge shown in FIGS. 1 to 3 is completed unfolded.

FIG. 7A is a lateral sectional view schematically showing a state in which the hinge member shown in FIG. 4 is unfolded by a certain angle, and FIG. 7B is a lateral sectional view schematically showing a state in which the hinge member shown in FIG. 4 is completely unfolded.

When the first and second bodies 110 and 120 are unfolded, the insertion portion 223 of the elastic member 220 is moved along the slot 213*a* of the supporting member 210 (refer to FIG. 7A). When the first and second bodies 110 and 120 are completed open, the protrusion 223*b* of the elastic member 220 is engaged with the locking groove 213*b* such that the open position can be fixed.

When the protrusion 223*b* is engaged with the locking groove 213*b* such that the open position is fixed, the open state between the first and second bodies 110 and 120 is maintained (refer to FIG. 7B). Here, the elastic member 220 then applies an elastic force toward a direction that the supporting member 210 is folded, namely, a direction that the first and second bodies 110 and 120 are closed.

On the other hand, a release button 113 for releasing the engaged state of the protrusion 223*b* with the locking groove 213*b* may be provided at the first or second body 110 or 120. As the release button 113 is operated, the engaged state between the protrusion 223*b* and the locking groove 213*b* such that the insertion portion 223 can be moved along the slot 213*a* to a position where the first and second bodies 110 and 120 are in the closed state. The release button 113 can adapt a structure of a general press-type switch, detailed explanation of which will be omitted.

As shown in FIGS. 4 and 5, in order to more stabilize an operation state between the supporting member 210 and the elastic member 220, a position fixing hole 240 may further be provided at one portion thereof (e.g., a central portion of the supporting member 210 and the elastic member 220) so as to be fixed to each other. The position fixing hole 240 may include an insertion member 241 adapted to maintain a certain interval between the supporting member 210 and the elastic member 220, and a coupling opening 242 adapted to allow the insertion member to be fixed between the supporting member 210 and the elastic member 220. Here, the supporting member 210 and the elastic member 220 may further have holes 214 and 224 to which the coupling opening 242 can be coupled.

Here, the supporting member 210 and the elastic member 220 may all be implemented as a plate spring. Also, an elastic coefficient of the elastic member 220 may be greater than that of the supporting member 210.

Figure 8:
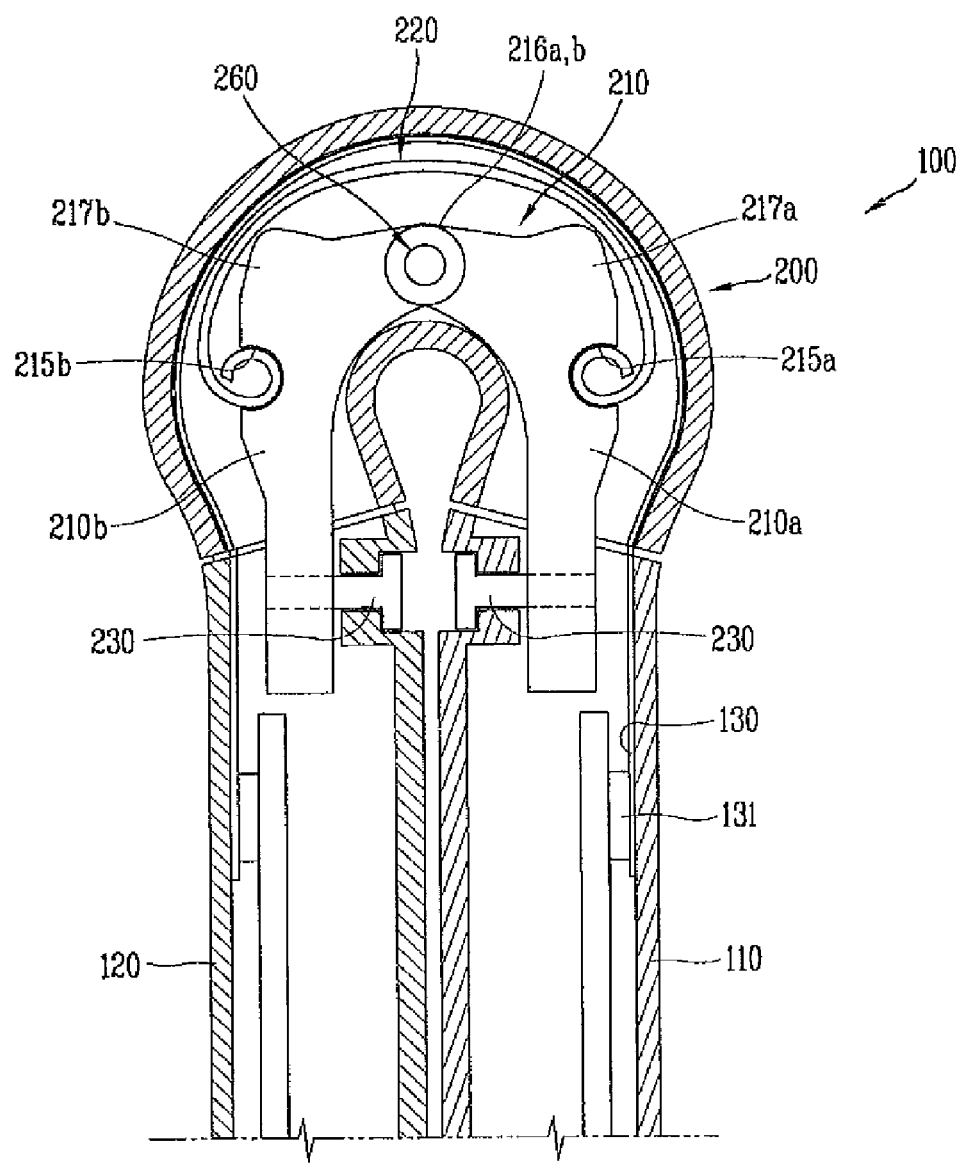
FIG. 8 is a lateral sectional view showing a configuration of a second embodiment of the hinge member provided in the housing shown in FIGS. 1 to 3.

FIG. 8 is a lateral sectional view schematically showing a configuration of a second embodiment of the hinge member provided in the housing 250 shown in FIGS. 1 to 3.

In the second embodiment of the hinge member as shown in FIG. 8, the hinge member includes two supporting members 210a and 210b both of which are rotatable by a rotation shaft 260.

The first supporting member 210a has one end portion coupled to one end portion of the first body 110 as shown in the first embodiment of the hinge member. Also, a rotation shaft coupling portion 216a is provided at the other end portion of the first supporting member 210a such that the other end portion of the first supporting member 210a can be rotatably coupled to one end portion of the second supporting member 210b.

In the meantime, the second supporting member 210b, like the first supporting member 210a, has one end portion coupled to one end portion of the second body 120 as shown in the first embodiment of the hinge member. A rotation shaft coupling portion 216b is provided at the other end portion of the second supporting member 210b such that the other end portion of the second supporting member 210b can be rotatably coupled to the one end portion of the first supporting member 210a.

The two supporting members 210a and 210b are rotatably coupled to each other by the rotation shaft 260. Here, each one end portion of the first and second supporting members 210a and 210b are coupled to each body 110 and 120 by a coupling unit 230, as shown in the first embodiment of the hinge member.

Elastic member coupling portions 215a and 215b to which the elastic member 220 can be coupled may further be provided at each certain portion of the supporting members 210a and 210b. Each end portion of the elastic member 220 may be coupled to the elastic member coupling portions 215a and 215b. Here, the elastic member 220 may be implemented as a wire spring or a plate-shaped spring. Each of the elastic member coupling portions 215a and 215b may adapt the same structure as that of an insertion groove. Therefore, the elastic member 220 implemented as the wire spring or the plate-shaped spring may have both end portions inserted into the insertion grooves.

Here, the elastic member 220 may be mounted such that when the first and second bodies 110 and 120 are in the closed state, a point where an elastic force is applied is positioned at a lower side of the rotation shaft 260, and when the first and second bodies 110 and 120 are in the open state, the point where the elastic force is applied is positioned at an upper side of the rotation shaft 260. That is, both end portions of the elastic member 220 may be positioned at both sides of the rotation shaft 260. Accordingly, the elastic member 220 applies a compression force such that the first and second supporting members 210a and 210b can be maintained in their closed state (refer to FIG. 8).

Figure 9A:
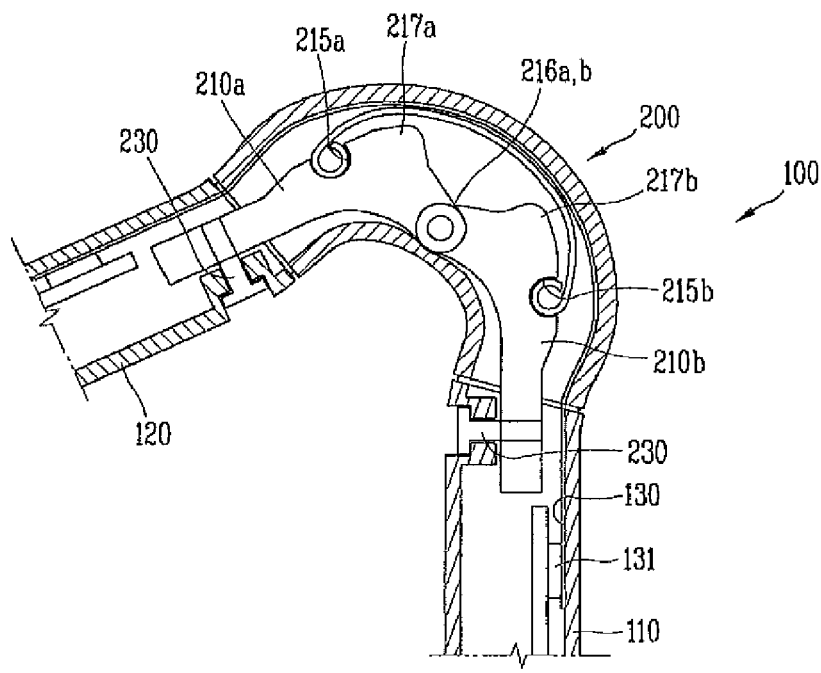
FIG. 9A is a lateral sectional view showing a state in which a hinge shown in FIG. 8 is unfolded by a particular angle.
Figure 9B:
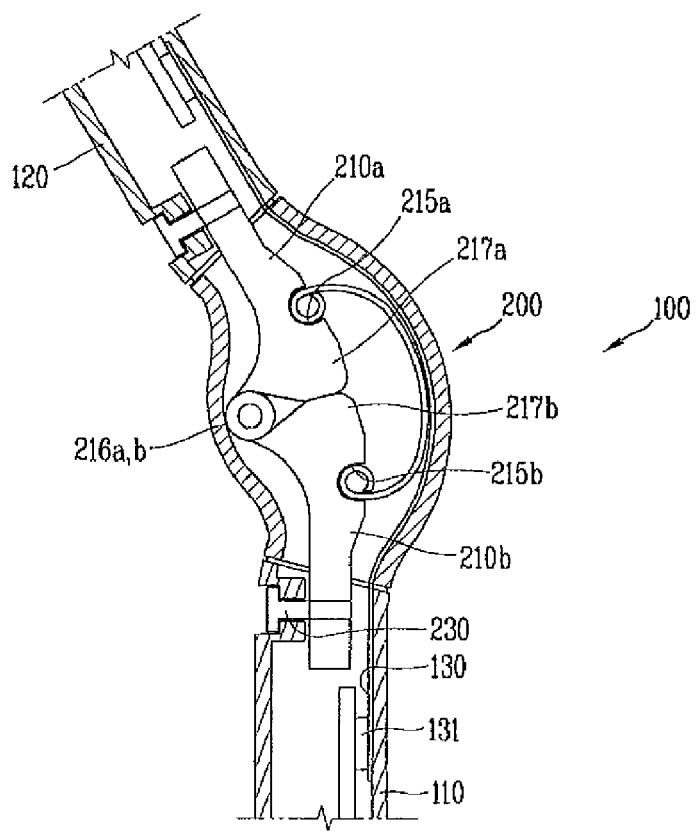
FIG. 9B is a lateral sectional view showing a state in which the hinge shown in FIG. 8 is completed unfolded.

FIG. 9A is a lateral sectional view schematically showing a state in which the hinge member shown in FIG. 8 is unfolded by a certain angle, and FIG. 9B is a lateral sectional view schematically showing a state in which the hinge member shown in FIG. 8 is completely unfolded.

In the state where the first and second supporting members 210a and 210b are open or closed, when the point to which the elastic force is applied is located in a straight line with the rotation shaft 260, a force to open or close the first and second bodies 110 and 120 is not generated by the elastic force (refer to FIG. 9A). Here, if the first and second supporting members 210a and 210b are rotated in one direction (i.e., an opening or closing direction), the first and second bodies 110 and 120 are open or closed by the elastic force.

In the open state between the first and second bodies 110 and 120, a compression force is applied from the other side of the rotation shaft 260 such that the first and second supporting members 210a and 210b can be maintained in their open state (refer to FIG. 9B).

On the other hand, in order to allow the first and second bodies 110 and 120 to be open by a certain angle, stopping protrusions 217a and 217b may further be formed respectively at one portions of the first and second supporting members 210a and 210b adjacent to the rotation shaft 260. When the first and second supporting members 210a and 210b are opened, the stopping protrusions 217a and 217b are contacted by each other, thereby restraining an open angle of the first and second supporting member 210a and 210b.

Figure 10:
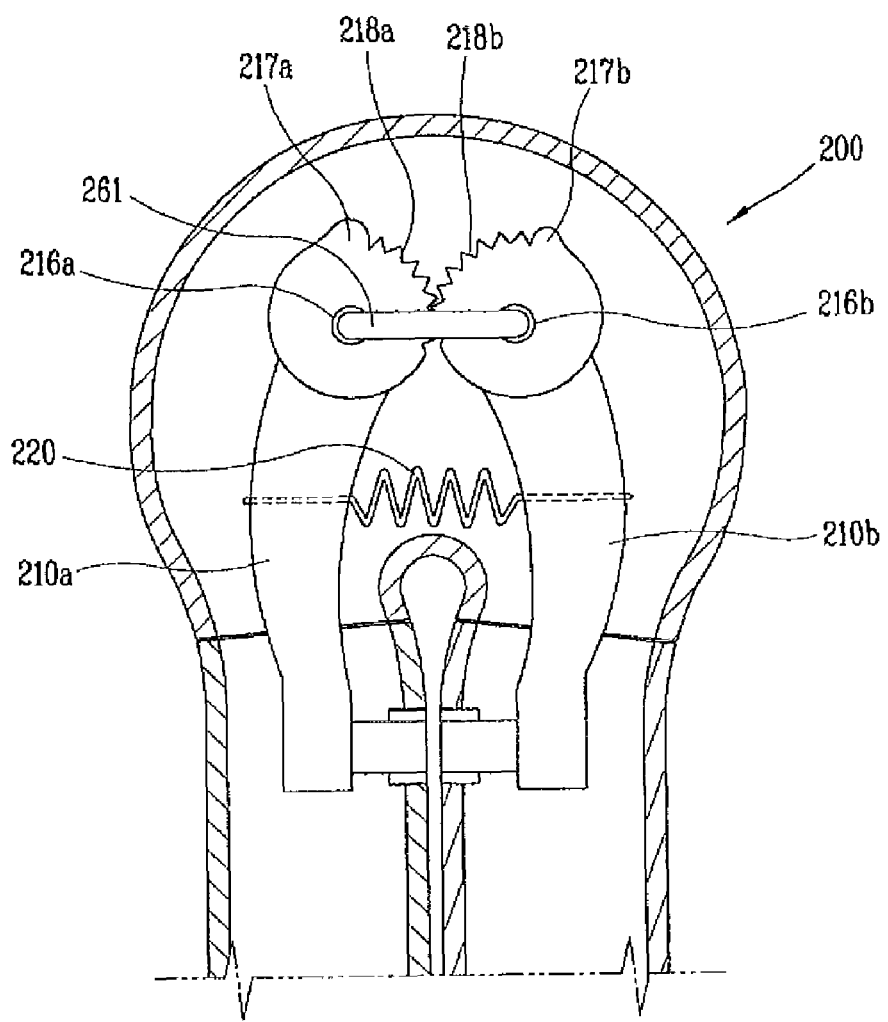
FIG. 10 is a lateral sectional view showing a configuration of a third embodiment of the hinge member provided in the housing shown in FIGS. 1 to 3.
Figure 11A:
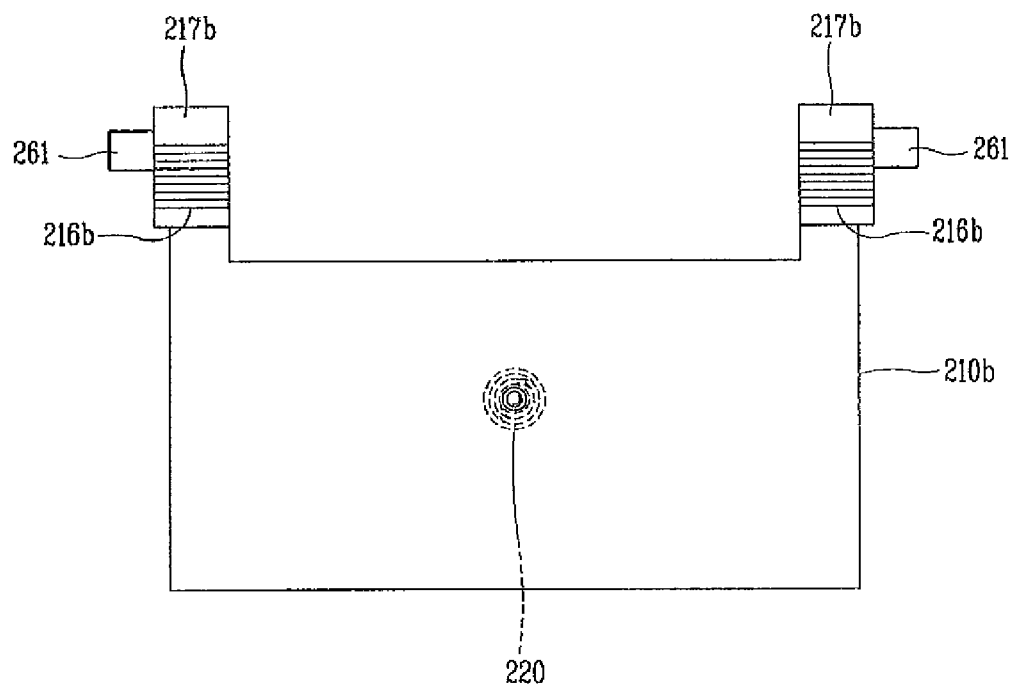
FIG. 11A is a lateral view showing a coupled state between a supporting member and an elastic member configuring a hinge shown in FIG. 10.
Figure 11B:
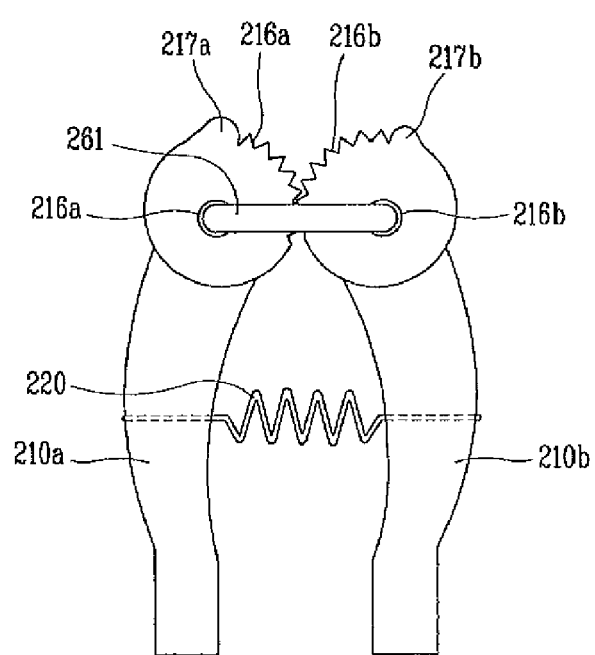
FIG. 11B is a front view showing the coupled state between the supporting member and the elastic member configuring the hinge shown in FIG. 10.
Figure 11C:
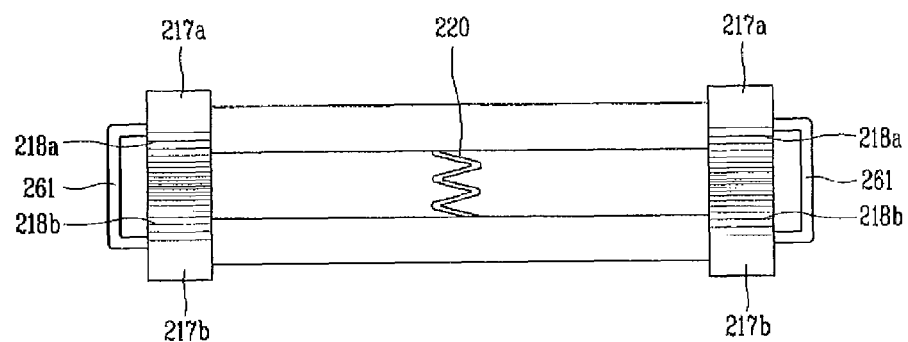
FIG. 11C is a plane view showing the coupled state between the supporting member and the elastic member configuring the hinge shown in FIG. 10.
Figure 12:
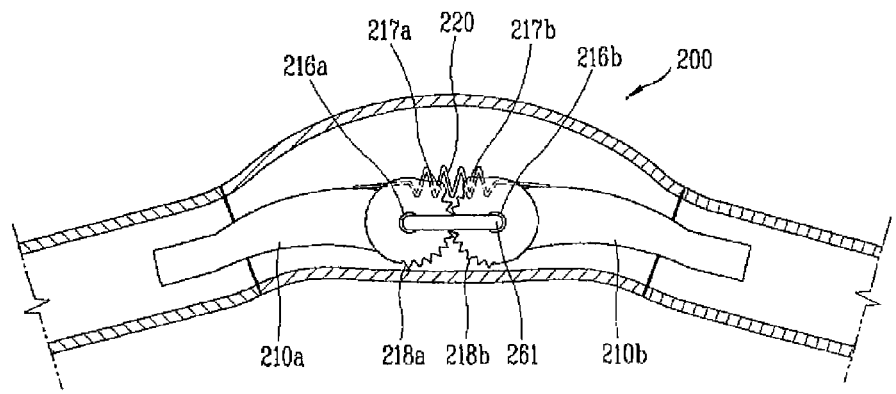
FIG. 12 is a lateral sectional view showing a state in which the hinge shown in FIG. 10 is completely unfolded.

FIG. 10 is a lateral sectional view schematically showing a configuration of a third embodiment of a hinge member provided in the housing 250 shown in FIGS. 1 to 3, and FIGS. 11A to 11C are sequentially lateral view, front view and plane view each schematically showing a coupled state between the supporting member and the elastic member configuring the hinge member shown in FIG. 10. Also, FIG. 12 is a lateral sectional view schematically showing a completely open state of the hinge member shown in FIG. 9.

In the third embodiment of the hinge member as shown in FIG. 10, the hinge member may include two supporting members 210a and 210b which are rotatable based on the rotation shaft member 261 having different rotation shafts for each supporting member 210a and 210b. This embodiment is similar to the second embodiment of the hinge member in that two supporting members 210a and 210b configure one complete supporting member; excluding that the rotation shaft member 261 has different rotation shafts.

Each one end portion of the first and second supporting members 210a and 210b, as shown in the first and second embodiments of the hinge member; may be coupled to end portions of the first and second bodies 110 and 120. However, rotation shaft coupling portions 216a and 216b are provided at the other end portions of the first supporting member 210a and the second supporting member 210b, respectively, such that the other end portion of each of the first and second supporting members 210a and 210b can be coupled onto each rotation shaft of the rotation shaft member 261. Gears 218a and 218b may be provided at positions near the rotation shaft coupling portions 216a and 216b. According to this configuration, the first and second supporting members 210a and 210*b* are coupled to each other to be rotatable based on the different rotation shafts of the rotation shaft member 261.

Here, like in the first embodiment of the hinge member; each end portion of the first and second supporting members 210*a* and 210*b* may be coupled to each of the bodies 110 and 120 by a coupling unit 230.

The elastic member 220 may be coupled to one portion of each of the supporting members 210*a* and 210*b*. Here, the elastic member 220 may be implemented as a coil spring such that it can provide at its initial position an elastic force to allow the first and second supporting members 210*a* and 210*b* to keep in the folded state (refer to FIG. 10). Also, in the open state, the elastic member 220 provides the elastic force to allow the first and second supporting members 210*a* and 210*b* to be maintained in the open state (refer to FIG. 12). In other words, as shown in the second embodiment of the hinge member, the elastic member 220 of the third embodiment of the hinge member can be mounted such that when the first and second bodies 110 and 120 are in the closed state, the point where the elastic force is applied is positioned at one side of the rotation shaft member 261, and when the first and second bodies 110 and 120 are in the open state, the point where the elastic force is applied is positioned at the other side of the rotation shaft member 261.

However, unlike in the second embodiment of the hinge member; a central portion of the elastic member 220 of the third embodiment of the hinge member is located at the one side of the rotation shaft member 261 when the first and second bodies 110 and 120 are in the closed state, and accordingly the elastic member 220 applies a compression force such that the first and second supporting members 210*a* and 210*b* can be maintained in the closed state (refer to FIG. 9). The central portion of the elastic member 220 is located at the other side of the rotation shaft member 261 when the first and second bodies 110 and 120 are in the open state, and accordingly the elastic member 220 applies a compression force such that the first and second supporting members 210*a* and 210*b* can be maintained in the open state (refer to FIG. 12).

On the other hand, as shown in the second embodiment of the hinge member, stopping protrusions 217*a* and 217*b* may further be formed at positions near each gear 218*a* and 218*b* such that the first and second bodies 110 and 120 can be opened by a certain angle. When the first and second supporting members 210*a* and 210*b* are opened, the stopping protrusions 217*a* and 217*b* are contacted by each other; thereby restraining the first and second supporting members 210*a* and 210*b* from being open over a certain angle.

Figure 13:
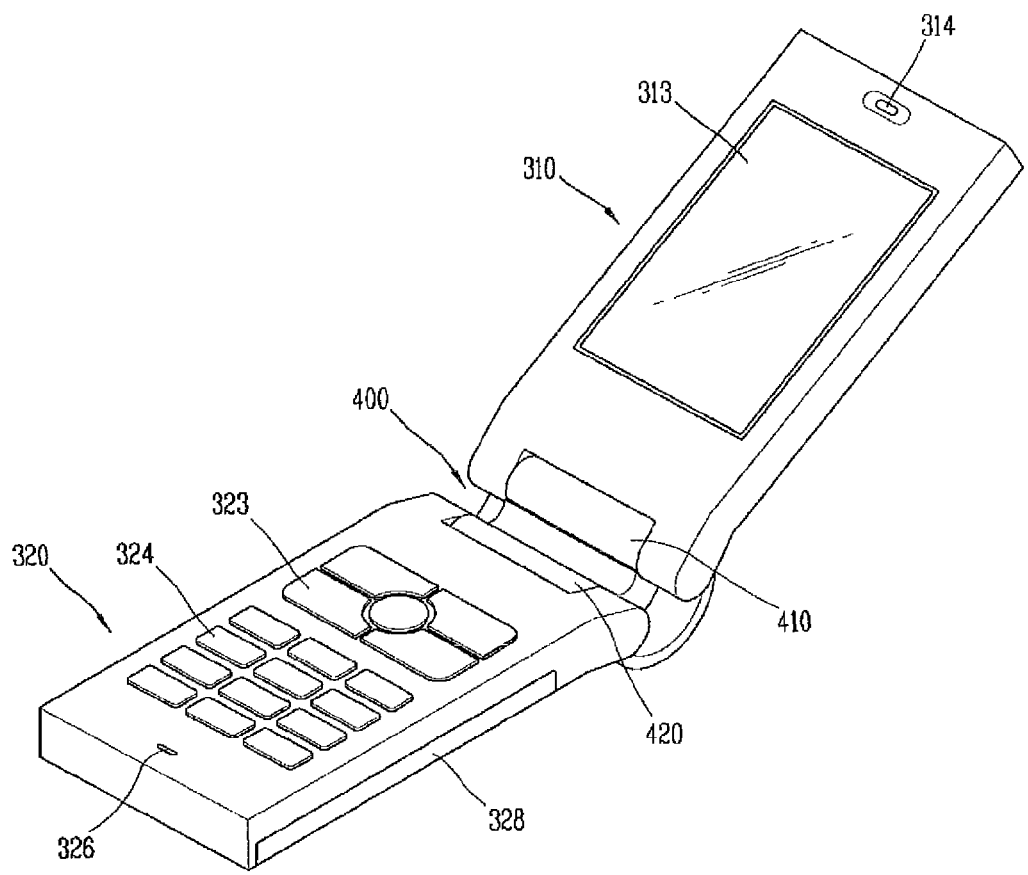
FIG. 13 is a perspective view showing a portable terminal in accordance with a second embodiment of the present invention.
Figure 14:
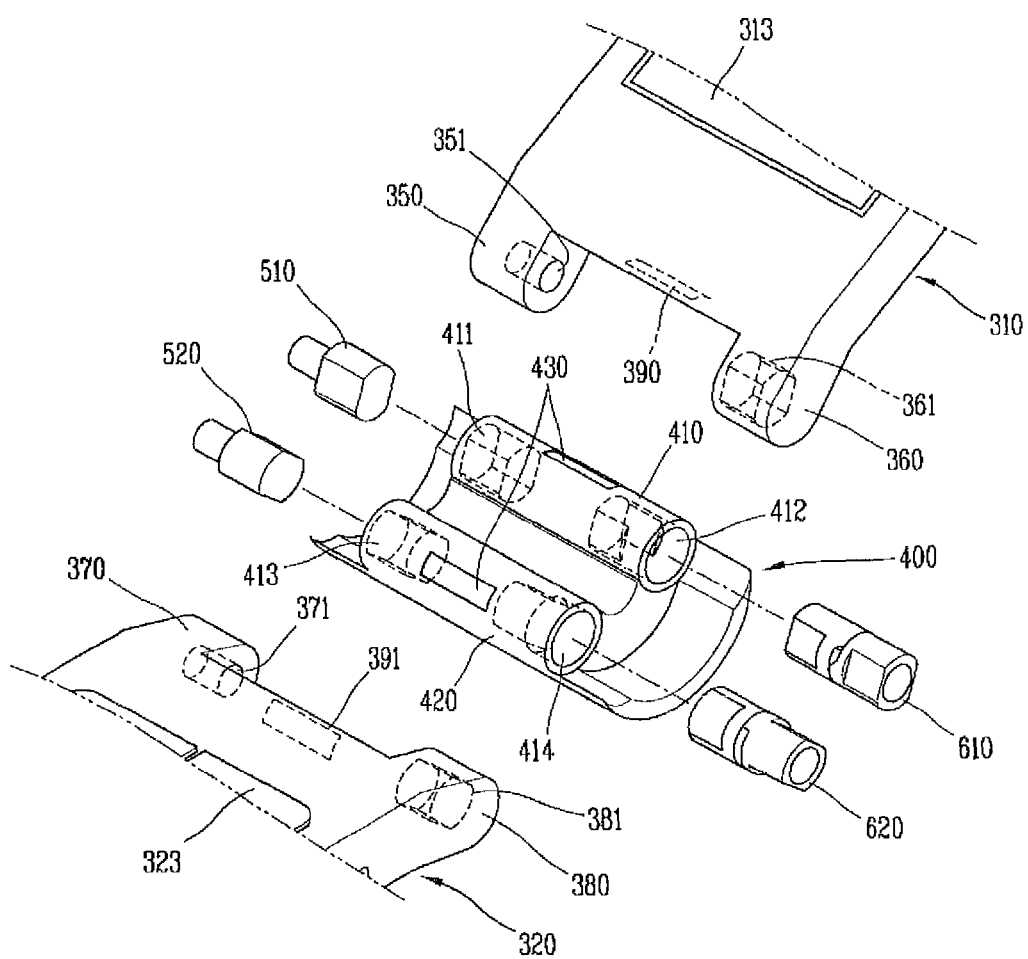
FIG. 14 is an exploded perspective view of the portable terminal shown in FIG. 13.

FIG. 13 is a perspective view showing a portable terminal in accordance with a second embodiment of the present invention. FIG. 14 is an exploded perspective view of the portable terminal shown in FIG. 13.

The portable terminal in accordance with the second embodiment of the present invention includes first and second bodies 310 and 320, which are rotatably coupled to each other by a cover 400.

The cover 400 is disposed to be adjacent to edges of the first and second bodies 310 and 320 such that its outer surface can connect the first body 310 to the second body 320 in the form of a curved line. That is, the cover 400 encompasses the edges of the first and second bodies 310 and 320 in the form of the curved line, and accordingly the first and second bodies 310 and 320 and the cover 400 can implement a seemingly integrated appearance.

A first hinge 510 is disposed at one end portion of the cover 400, and a second hinge 520 is disposed at the other end portion of the cover 400.

The first body 310 includes a display 313 for displaying information and a receiver 314 installed above the display 313 for outputting sound. First hinge portions 350 and 360 for hinge-coupling to the cover 400 are formed below the display 313. A first hinge insertion hole 351 in which the first hinge 510 is inserted is formed at one of the first hinge portions 350 and 360, and a first stopper insertion hole 361 in which a stopper 610 (to be described hereafter) is inserted is formed at the other one of the first hinge portions 350 and 360.

First and second manipulating portions 323 and 324 are disposed at a front face of the second body 320 to allow users to input information in a pushing manner. Second hinge portions 370 and 380 for hinge-coupling to the cover 400 are formed at both end portions of the second body 320, which are located above the first manipulating portion 323. A second hinge insertion hole 371 in which the second hinge 520 is inserted is formed at one (e.g., 370) of the second hinge portions 370 and 380, and a second stopper insertion hole 381 in which a second stopper 620 is inserted is formed at the other one (e.g., 380) of the second hinge portions 370 and 380.

A first cover hinge portion 410 for coupling the cover 400 to the first body 310 is disposed at one side of the cover 400, and a second cover hinge portion 420 for coupling the cover 400 to the second body 320 is disposed at the other end of the cover 400.

A third hinge insertion hole 411 in which the first hinge 510 is inserted is formed at one end of the first cover hinge portion 410, and a third stopper insertion hole 412 in which the first stopper 610 is inserted is formed at the other end of the first cover hinge portion 410. A fourth hinge insertion hole 413 in which the second hinge 520 is inserted is formed at one end of the second cover hinge portion 420, and a fourth stopper insertion hole 414 in which the second stopper 620 is inserted is formed at the other end of the second cover hinge portion 420.

Figure 15:
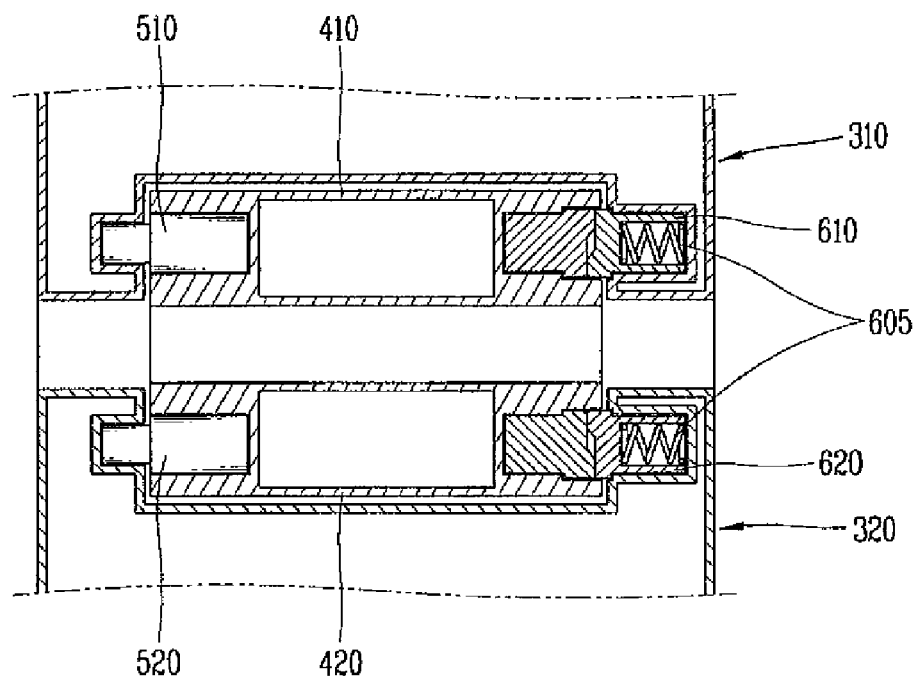
FIG. 15 is a sectional view showing a coupled state among first and second bodies, a cover and first and second hinges of the portable terminal in FIG. 13.

FIG. 15 is a sectional view showing a coupled state among the first and second bodies 310 and 320, the cover 400, the first and second hinges 510 and 520 and the first and second stoppers 610 and 620.

The first hinge 510 is inserted into the first hinge insertion hole 351 formed at the first body 310 and the third hinge insertion hole 411 formed at the cover 400 so as to hinge-couple the first body 310 to the cover 400. Here, the first hinge 510 may be formed such that the first body 310 can be stopped at a certain angle.

The second hinge 520 is inserted into the second hinge insertion hole 371 formed at the second body 320 and the fourth hinge insertion hole 413 formed at the cover 400 so as to hinge-couple the second body 320 to the cover 400. Here, the second hinge 520 may be formed to be semi-automatically rotated by an elastic force when a hinge-coupled member is rotated over a certain angle.

The configuration in which the first hinge 510 or the second hinge 520 is stopped at a certain angle or semi-automatically rotated has been disclosed, and thus it can be understood by those skilled in the art, detailed description of which will be omitted accordingly.

According to the above processes, the first and second bodies 310 and 320 are coupled to the cover 400, thusly to be in the state as shown in FIG. 15. The first and second bodies 310 and 320 are rotatably coupled to the cover 400 by the first hinge 510 and the second hinge 520.

The first hinge 510 and the second hinge 520 may be implemented such that a rotation force to rotate the second hinge 520 can be greater than a rotation force to rotate the first hinge 520. Therefore, when the first body 310 and the second body 320 are folded with each other namely, in the closed state, if the first body 310 is rotated, the first hinge 510 is operated earlier than the second hinge 520.

The first hinge 510 is configured to stop the rotation of the first body at a certain angle when the first body 310 is rotated. The first hinge 510 can be implemented to serve this function by its own configuration. The portable terminal according to this embodiment may further comprise a first stopper 610 which reduces a force applied to the first hinge 510 in order to stop the rotation, and surely maintains the stopped state.

The first stopper 610 is fixedly inserted into the first stopper insertion hole 361 formed at the first body 310 and the third stopper insertion hole 412 formed at the cover 400, respectively. Here, when the first body 310 is rotated based on the first hinge 510, the first stopper 610 allows the first body 310 to be stopped after being rotated up to a certain angle.

Like the first stopper 610, a second stopper 620 may be disposed between the second body 320 and the cover 400 in order to allow the second body 320 to stop its rotation at a certain angle. The second stopper 620 is fixedly inserted into the second stopper insertion hole 381 formed at the second body 320 and the fourth stopper insertion hole 414 formed at the cover 400, respectively. Here, after the first stopper 610 stops the rotation of the first body 310, the second stopper 620 stops the rotation of the first body 310 and the cover 400 at a certain angle after the first body 310 and the cover 400 are integrally rotated based on the second hinge 520.

The configurations of the first stopper 610 and the second stopper 620 will be described again in more detail later. Now, an operation of the portable terminal in accordance with the second embodiment of the present invention as shown in FIG. 13 will be described.

FIG. 16 is a view showing an operation state of the portable terminal shown in FIG. 13.

Figure 16A:
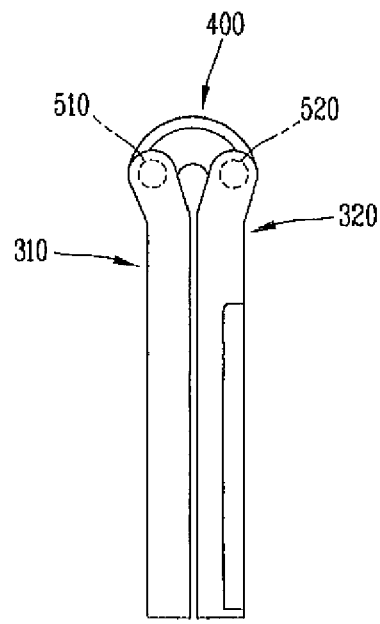
FIG. 16 is a view showing an operation sate of the portable terminal shown in FIG. 13.

In the closed state as shown in FIG. 16A, when the first body 310 is rotated, the first body 310 is rotated based on the first hinge 310. Here, if the first hinge 510 is implemented to be stopped at a certain angle, the rotation of the first body 310 can be stopped at the certain angle. Thus, a user can set the angle where the rotation of the first body 310 is stopped. Such configuration can protect the user's private life.

Figure 16B:
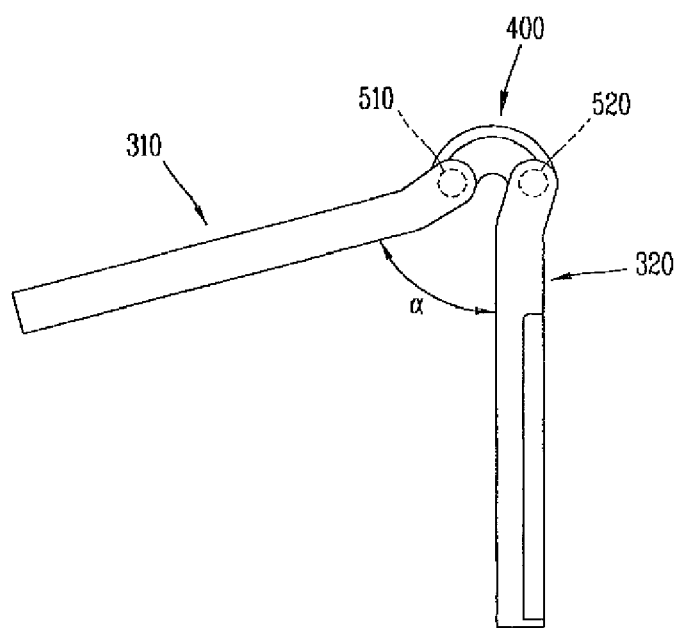

As shown in FIG. 16B, when the first body 310 is rotated up to a first angle α, the first body 310 stops rotating by the first stopper 610 (refer to FIG. 15). In this state, when continuously rotating the first body 310, the first body 310 is integrally rotated together with the cover 400 with being fixed thereto, with respect to the second body 320, based on the second hinge 520. Here, in case where the second hinge 520 is formed to be semi-automatically rotated, when a user applies a force greater than a certain value, the first body 310 and the cover 400 are integrally rotated up to a second angle β in a semi-automatic manner.

Figure 16C:
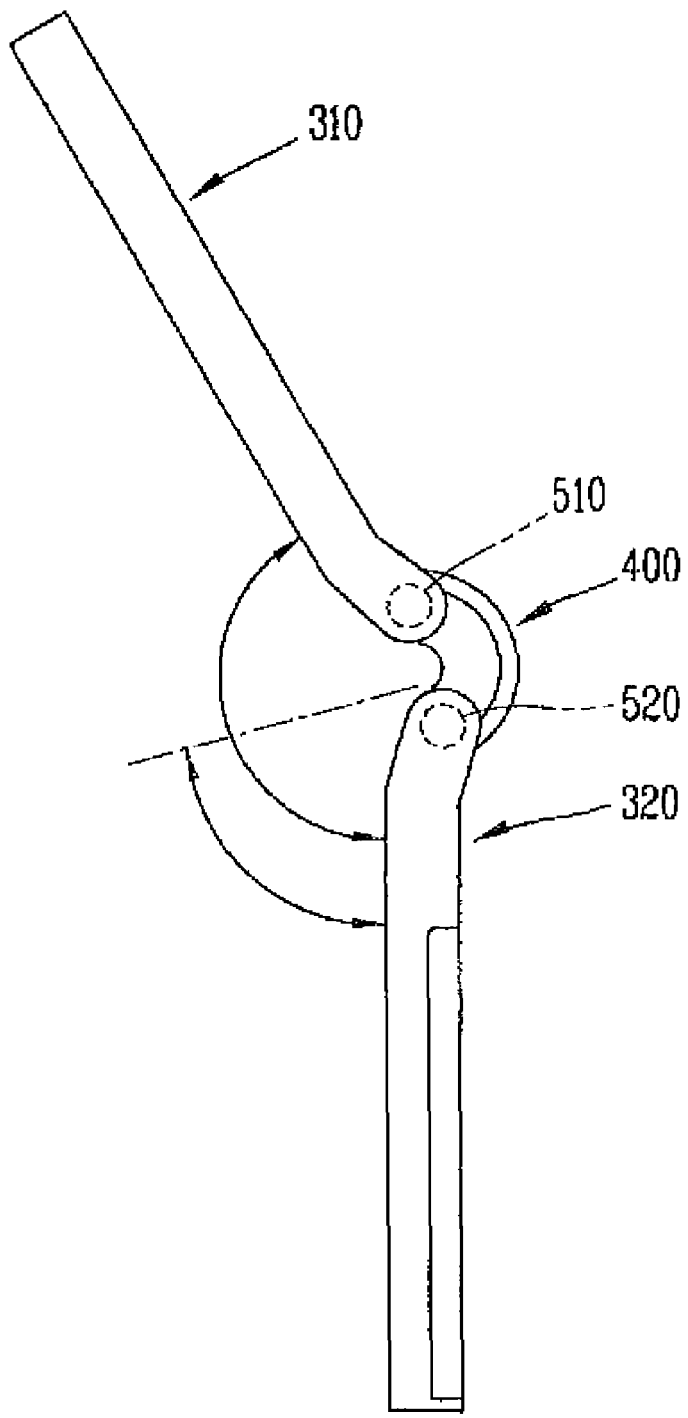

As shown in FIG. 16C, when the first body 310 and the cover 400 are integrally rotated up to the second angle β, the second stopper 620 (refer to FIG. 15) operates to stop the rotation of the first body 310 and the cover 400.

As such, by combining the configuration in which the rotation of the first hinge 510 is stopped at the certain angle with the configuration in which the rotation of the second hinge 520 is semi-automatically performed, it may be available to implement more flexible opening pattern. According to the reverse order of the opening, the first body 310 is closed with respect to the second body 320.

In case where the first angle α is 75° and the second angle β is 150° the first hinge 510 is moved up to 75° to be then stopped, and the second hinge 520 is moved up to another 75°. Accordingly, the first body 100 is moved up to 150° with respect to the second body 120.

Next, the configurations of the first stopper 610 and the second stopper 620 (hereafter, referred to as 'stopper 600' including 'first stopper 610' and 'second stopper 620') will be described in detail.

FIG. 17 is a perspective view showing a stopper 600.

The stopper 600 may include a first fixed member 601 fixed to the cover 400 and a second fixed member 603 fixed either to the first body 310 or to the second body 320 and rotated with facing the first fixed member 601.

A first contact surface 602 is formed at the first fixed member 601, and a second contact surface 604 is formed at the second fixed member 603. When being rotated with respect to the first fixed member 601 by a certain angle, the first contact surface 602 and the second contact surface 604 come in contact with each other, thus to stop rotating of the second fixed member 603.

Figure 17A:
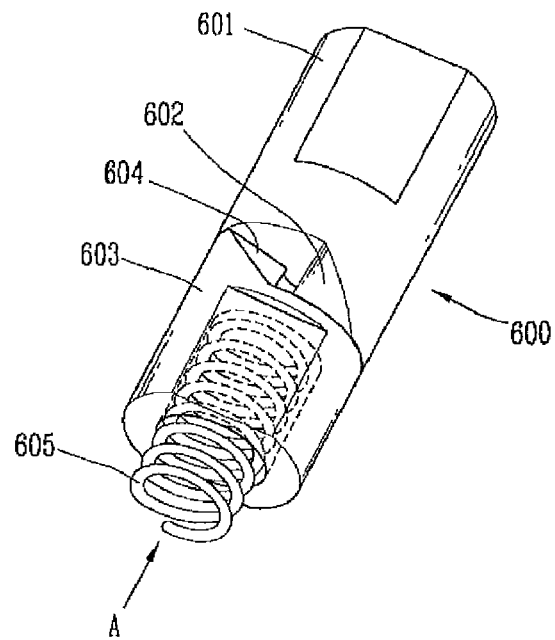
FIG. 17 is a perspective view showing configuration and operation of a stopper.
Figure 17B:
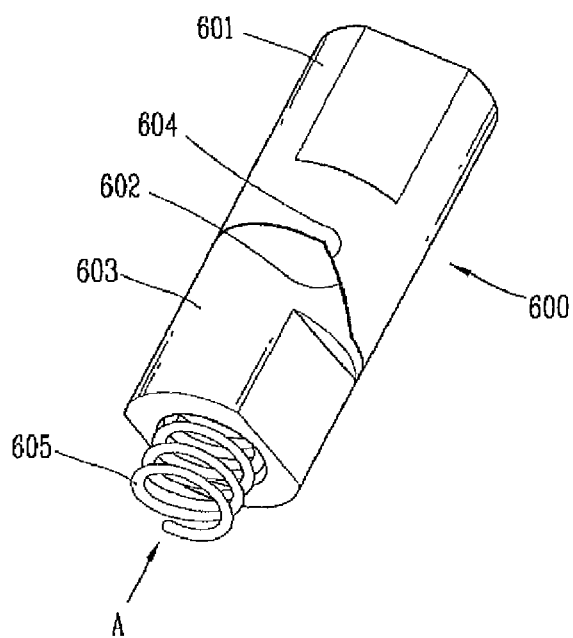

As shown in FIG. 17A, before the second fixed member 603 is rotated, the first contact surface 602 and the second contact surface 604 are disposed to be spaced apart from each other. As shown in FIG. 17B, when the second fixed member 603 is rotated such that the first contact surface 602 comes in contact with the second contact surface 604, the rotation of the second fixed member 603 is stopped.

In the state that the first body 310 and the cover 400 are rotated up to the second angle (i.e., β, referring to FIG. 16) to be then stopped, if a rotation force is further applied in their rotational direction, impact is applied to the first and second contact surfaces 602 and 604 of the stopper 600, which may cause the first and second contact surfaces 602 and 604 to be abraded or damaged. In order to avoid such abrasion or damage, the first contact surface 602 and the second contact surface 604 are formed to be inclined such that the second fixed member can be further rotated as compared to the first fixed member 601.

Figure 17C:
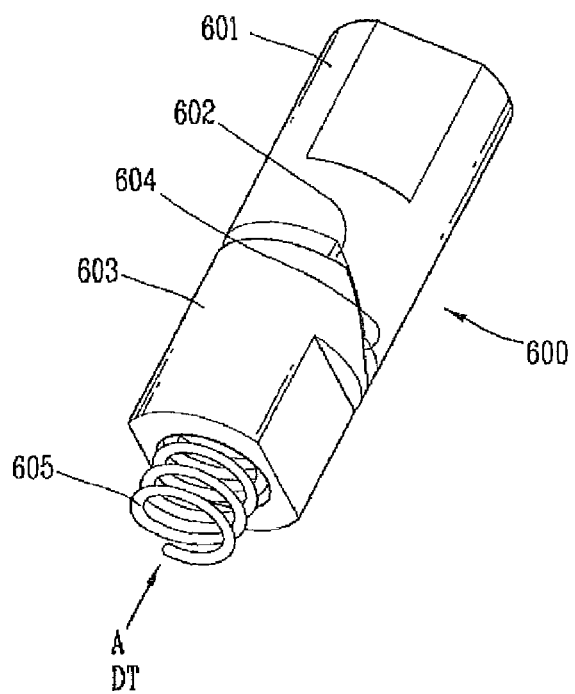

As shown in FIG. 17C, when an increased force is applied to the second fixed member 603 in its rotational direction, the second contact surface 604 is moved along the first contact surface 602, resulting in the rotation of the second fixed member 603.

Here, an elastic member 605 for applying an elastic force to the first and second fixed members 601 and 603 is mounted at the second fixed member 603 to return the second fixed member 603 to its original position (i.e., the state shown in FIG. 17B). An elastic member installation hole 606 in which the elastic member 605 is installed is formed at the second fixed member 603. One side of the elastic member 605 is supported by the end of the elastic member installation hole 606, and the other side thereof is supported by the end of the first stopper insertion hole 361 or the second stopper insertion hole 381 formed at the first body 310 or the second body 320 to which the second fixed member 603 is coupled. A direction indicated by an arrow A in FIG. 17 denotes a direction of the elastic force applied by the elastic member 605.

In the second embodiment of the present invention, the elastic member 605 is mounted at the second fixed member 603, but it may be mounted at the first fixed member 601. The second fixed member 603 may be returned from the state of FIG. 17C to the state of FIG. 17B by the elastic force applied by the elastic member 605.

Figure 18:
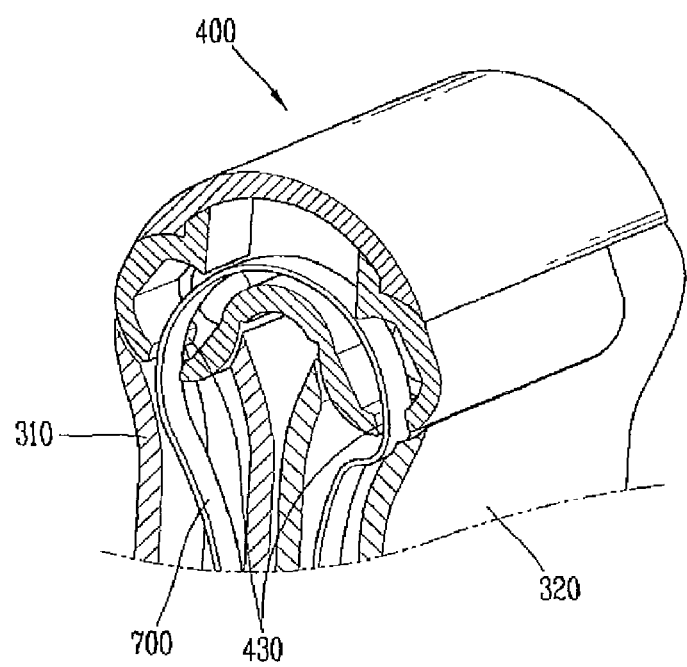
FIG. 18 is an inner perspective view showing the portable terminal having a cable therein which electrically connects the first body to the second body.

FIG. 18 is an inner perspective view showing the portable terminal having a cable 700 which electrically connects the first and second bodies 310 and 320 to each other.

The cable 700 for electrically connecting the first and second bodies 310 and 320 to each other is installed in the central portion of the first and second bodies 310 and 320 and the cover 400. The cable 700 may be implemented as a Flexible Printed Circuit Board (FPCB). The first and second bodies 310 and 320 may be rotated by about 75°. Accordingly, the cable 700 can be installed without any limitation on the installation space.

Opening portions 430 (refer to FIG. 14), through which the cable 700 passes, are formed at the central portions of the first cover hinge portion 410 and the second cover hinge portion 420 of the cover 400. A cavity is formed in the cover 400 to connect the opening portions 430 to each other. The cable 700 sequentially passes through a first cable passing hole 390 (refer to FIG. 14) formed at the first body 310, the cavity formed in the cover 400 and a second cable passing hole 391 formed a second body 320, so as to electrically connect the first body 310 and the second body 320 to each other.

The related art portable terminal has a limitation on the width of the cable due to spatial limitation. However, the portable terminal of the present invention can overcome the spatial limitation to increase the width of the cable 700, for example, the width of the FPCB. The increase in the width of the FPCB allows a large amount of information to be transmitted between the first body 310 and the second body 320 and also allows more rapid information transmission therebetween.

As described above, the present invention does not restrict the design appearance of the portable terminal, and can provide a new design appearance by having a structure of a hinge unit integrally formed with the bodies.

The present invention can avoid the conventional structure of the hinge unit from being exposed to the exterior, which can prevent foreign materials from being introduced into the portable terminal, thereby avoiding malfunctions of the portable terminal.

Also, as the first body and the cover are sequentially rotated, the first body can have more flexible opening pattern with respect to the second body.

By mounting stoppers between the cover and the first body, and between the cover and the second body, it is possible to reduce a force applied to first and second hinges and to positively stop the rotation of the first body and the cover.

In addition, by allowing a cable for electrically connecting the first body and the second body to each other to pass through the central portions of the first body and the second body, a large amount of information can be transmitted more rapidly between the first and second bodies.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
   first and second bodies; and
   a hinge unit configured to fold or unfold the first and second bodies in a rotation manner, wherein the hinge unit comprises:
   a hinge member coupled to respective end portions of each of the first and second bodies; and
   a housing having one end coupled to the first body and another end coupled to the second body so as to encompass the hinge member therein such that the hinge member is not exposed to the exterior,
   wherein the housing has a hollow passage and the hinge member is accommodated in the hollow passage, and
   wherein the hinge member comprises:
      a supporting member having one end coupled to one end of the first body and another end coupled to one end of the second body so as to enable opening and/or closing of the first and second bodies; and
      an elastic member having one end coupled to one side of the supporting member and another end coupled to another side of the supporting member, the elastic member configured to apply one of an opening force to the supporting member when the two bodies are opened and a closing force to the supporting member when the two bodies are closed,
      wherein a slot is formed at one face of the supporting member and a corresponding insertion portion is formed at one end of the elastic member.

2. The portable terminal of claim 1, wherein at least one of the supporting member and the elastic member comprise plate-shaped springs.

3. The portable terminal of claim 1, wherein an anti-separation portion which has a wider width than a width of the slot is formed at one end of the insertion portion.

4. The portable terminal of claim 1, further comprising:
   a locking groove formed in the supporting member extending from the slot, the locking groove having a width wider than a width of the slot, and
   a protrusion formed at the elastic member in an area adjacent to the insertion portion.

5. The portable terminal of claim 4, further comprising:
   a release button disposed in one of the first and second bodies and configured to release the protrusion.

6. The portable terminal of claim 1, wherein the housing comprises:
   an elastic material.

7. The portable terminal of claim 6, wherein the housing comprises wrinkled portions.

8. A portable terminal, comprising:
   first and second bodies; and
   a hinge unit configured to fold or unfold the first and second bodies in a rotation manner, wherein the hinge unit comprises:
      a hinge member coupled to respective end portions of each of the first and second bodies; and
      a housing having one end coupled to the first body and another end coupled to the second body so as to encompass the hinge member therein such that the hinge member is not exposed to the exterior,
      wherein the hinge member comprises:
         a supporting member having one end coupled to one end of the first body and another end coupled to one end of the second body so as to enable opening and/or closing of the first and second bodies; and an elastic member having one end coupled to one side of the supporting member and another end coupled to another side of the supporting member, the elastic member configured to apply one of an opening force to the supporting member when the two bodies are opened and a closing force to the supporting member when the two bodies are closed, wherein the supporting member comprises:
 a first supporting member having one end coupled to the first body and another end including a rotation shaft coupling portion;
 a second supporting member having one end coupled to the second body and another end including a rotation shaft coupling portion; and
 a rotation shaft mounted on the rotation shaft coupling portions of the first and second supporting members,
 wherein each of the first and second supporting members includes an elastic member coupling portion to which the elastic member is coupled.

9. The portable terminal of claim 8, further comprising:
 stopping protrusions formed in positions of the first and second bodies which are adjacent to the rotation shaft and configured to maintain a certain angle between which the two bodies are opened.

10. The portable terminal of claim 8, wherein each elastic member coupling portion is formed as an insertion groove, and the elastic member comprises a wire or plate-shaped spring, and both end portions of the elastic member are inserted into the insertion groove.

11. A portable terminal comprising:
 first and second bodies; and
 a hinge unit configured to fold or unfold the first and second bodies in a rotation manner, wherein the hinge unit comprises:
  a hinge member coupled to respective end portions of each of the first and second bodies; and
  a housing having one end coupled to the first body and another end coupled to the second body so as to encompass the hinge member therein such that the hinge member is not exposed to the exterior, wherein the hinge member comprises:
   a supporting member having one end coupled to one end of the first body and another end coupled to one end of the second body so as to enable opening and/or closing of the first and second bodies; and
   an elastic member having one end coupled to one side of the supporting member and another end coupled to another side of the supporting member, the elastic member configured to apply one of an opening force to the supporting member when the two bodies are opened and a closing force to the supporting member when the two bodies are closed, wherein the supporting member comprises:
    a first supporting member coupled to the first body and having a first rotation shaft coupling portion and a first gear;
    a second supporting member coupled to the second body and having a second rotation shaft coupling portion and a second gear; and
    a rotation shaft mounted in the first and second rotation shaft coupling portions such that each gear of the first and second supporting members is rotatably engaged therewith,
   wherein end portions of the elastic member are coupled to the first and second supporting member, respectively.

12. The portable terminal of claim 11, wherein stopping protrusions are formed respectively at positions of the first and second bodies which are adjacent to the rotation shaft.

13. The portable terminal of claim 11, wherein the elastic member comprises:
 a coil spring.

14. A portable terminal, comprising:
 first and second bodies;
 a cover rotatably connected to one end of each of the first and second bodies and having an outer surface connected to the first and second bodies in the form of a curved line;
 a first hinge rotatably connecting the first body to the cover, the first hinge disposed in one end portion of the cover, the first hinge configured to enable the first body to be rotated up to a first angle and then to be stopped; and
 a second hinge rotatably connecting the second body to the cover, the second hinge disposed in another end portion of the cover, the second hinge configured to enable the first body and/or the cover to be rotated from the first angle up to a second angle.

15. The portable terminal of claim 14, wherein the first hinge is formed such that the rotation of the first body is stopped at a certain angle, and the second hinge is formed such that when the first body and the cover are rotated over a certain angle, the first body and the cover are rotated up to the second angle without being stopped.

16. The portable terminal of claim 14, further comprising:
 at least one of a first stoppers disposed between the first body and the cover and a second stopper disposed between the second body and the cover, the at least one of a first and second stopper configured to restrict a range of rotation of the first body or the cover.

17. The portable terminal of claim 16, wherein at least one of the first and second stopper comprises:
 a first fixed member fixed to the cover and having a first contact surface; and
 a second fixed member fixed to the first or second body and having a second contact surface,
 wherein when the second fixed member is rotated to the first fixed member by a certain angle, the first contact surface and the second contact surface come in contact with each other to stop the rotation of the second fixed member.

18. The portable terminal of claim 17, wherein
 the first contact surface and the second contact surface have inclined surfaces which are formed to be engaged with each other, and
 at least one of the first and second stopper further comprises an elastic member configured to apply an elastic force to one of the first fixed member and the second fixed member such that when the first body and the cover are rotated over the second angle, the inclined surfaces are returned to positions facing each other.

19. The portable terminal of claim 16, wherein the at least one of a first and second stopper comprises:
 a first stopper configured to restrict the first body from being rotated over the first angle and a second stopper configured to restrict the first body and the cover from being rotated over the second angle.

20. The portable terminal of claim 14, wherein the cover comprises:
 a cavity configured to accommodate a cable for electrically connecting the first body and the second body to each other.

* * * * *